Aug. 20, 1968     D. SCARAMUCCI     3,397,861
VALVE SEAT WITH BACKING
Filed Aug. 25, 1966     2 Sheets-Sheet 1
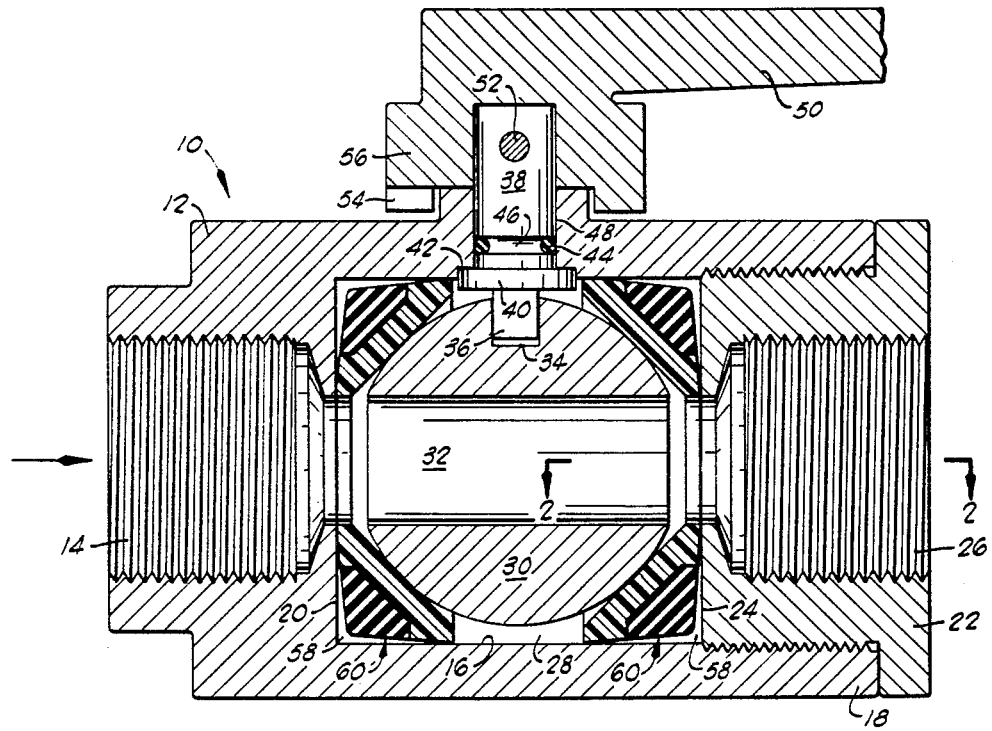
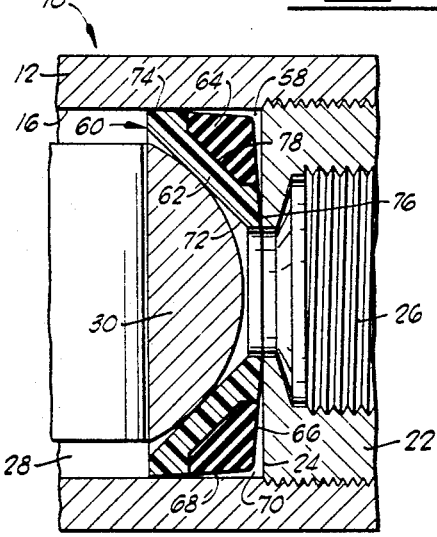
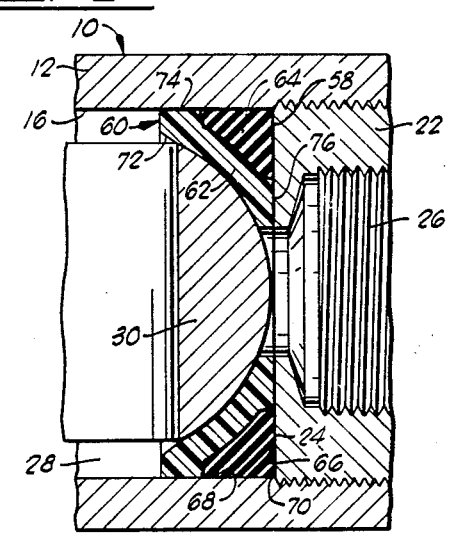
INVENTOR.
DOMER SCARAMUCCI
BY
Dunlap and Laney
ATTORNEYS Aug. 20, 1968  D. SCARAMUCCI  3,397,861
VALVE SEAT WITH BACKING Filed Aug. 25, 1966  2 Sheets-Sheet 2

INVENTOR.
DOMER SCARAMUCCI
BY
Dunlop and Laney
ATTORNEYS

United States Patent Office 3,397,861
Patented Aug. 20, 1968

3,397,861
VALVE SEAT WITH BACKING
Domer Scaramucci, 3245 S. Hattie,
Oklahoma City, Okla. 73129
Filed Aug. 25, 1966, Ser. No. 575,025
24 Claims. (Cl. 251—175)

This invention relates generally to improvements in valves, and more particularly, but not by way of limitation, to an improved valve seat particularly suited for use in ball valves. Related subject matter is disclosed and claimed in my co-pending application Ser. No. 417,111, filed Dec. 9, 1964, now Patent No. 3,347,517, and entitled "Valve and Seal," and in my co-pending application Ser. No. 575,077, entitled "Flexible Valve Seat" filed on even date herewith.

As it is well known in the art, it has become rather common practice to form valve seats, and particularly ball valve seats, of what are commonly known as plastic materials, such as nylon and Teflon. Such a material provides an effective support for a valve member, since it is not easily subject to extrusion, and is rugged, but the relative inflexibility of such materials has caused some problems.

In many valve designs, the valve member is supported for movement a short distance downstream when in a closed position and when subjected to an appreciable pressure. In the past, plastic material valve seats have usually employed a relatively flexible lip portion to engage the valve member when the valve member is substantially centered in the valve chamber to provide a seal and to allow the valve member to move at least a short distance downstream when subjected to relatively high pressure. However, it has been difficult to form plastic material valve seats with flexible lips where the lips do not become damaged by repeated opening and closing movements of the valve member.

In its broader aspects, the present invention contemplates a seat particularly suited for a ball valve which includes an elastic material bearing ring having a seating surface to engage the valve ball and being of a cross-sectional thickness to flex when the valve ball is moved downstream, and an elastic material backing ring, having a lower modulus of elasticity than the bearing ring, secured to the side of the bearing ring opposite to said seating surface in a position to be trapped in the valve when the bearing ring is flexed by downstream movement of the valve ball to limit said flexing of the bearing ring.

An object of this invention is to provide a valve seat of a material which will not be extruded or damaged and yet which is sufficiently flexible to provide both a valve member support and seal.

Another object of this invention is to provide a valve seat which requires no machining in the manufacture thereof.

A further object of this invention is to provide a valve seat which will effectively seal with a valve member in both high and low pressure service and which will not be damaged during high pressure service.

A still further object of this invention is to provide a valve which may be economically manufactured, which will have a long service life, and which will provide an effective control of fluid in a fluid circuit.

Other objects and advantages of the invention will be evident from the following detailed description when read in conjunction with the accompanying drawings which illustrate the invention.

FIG. 1 is a vertical sectional view through a valve constructed in accordance with this invention.

FIG. 2 is a partial sectional view as taken substantially along lines 2—2 of FIG. 1, with the valve member being moved to a closed position.

FIG. 3 is a view similar to FIG. 2 but illustrating the operation of the downstream seat when the valve member is forced downstream.

Figure 4:
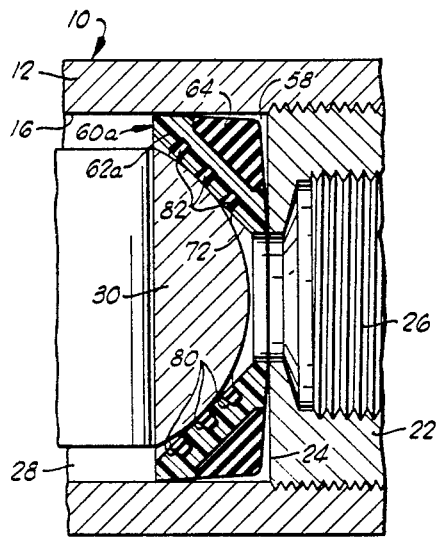
FIG. 4 is another view similar to FIG. 2 illustrating another embodiment of this invention.

Referring to the drawings in detail, and particularly FIG. 1, reference character 10 generally designates a ball valve constructed in accordance with this invention. The valve 10 includes a valve body 12 having a threaded inlet 14 in one end thereof and a larger counterbore 16 extending from the opposite end 18 thereof to provide a shoulder or wall 20 at the intersection of the inlet 14 and counterbore 16 which extends substantially normal to the axis of the inlet 14. A connector 22 is threadedly secured in the end 18 of the valve body 12 and has a flat inner end 24 forming a shoulder or wall which also extends substantially normal to the axis of the inlet 14. A threaded outlet 26 is formed through the center of the connector 22 in alignment with the inlet 14, such that the valve 10 may be secured in a fluid circuit. It will also be understood that rather than having the inlet 14 and outlet 26 threaded for connection with adjacent sections of a pipeline, the valve 10 could be secured in the fluid circuit by other mechanisms, such as flanges or union-type connectors.

The counterbore 16, between the end walls 20 and 24, forms a valve chamber 28 for a valve ball 30. The ball 30 has the usual port 32 therethrough which is aligned with the inlet 14 and outlet 26 when the valve is in an open position as illustrated in FIG. 1 and which is extended in a direction normal to the axis of the inlet 14 and outlet 26 when the valve is in a closed position as illustrated, for example, in FIG. 2.

As shown in FIG. 1, the ball 30 is provided with a rectangular slot 34 in the top thereof to receive the lower end 36 of a valve stem 38 by means of which the ball 30 is turned between its open and closed positions. The end 36 of the valve stem 38 is rectangular in cross section and the slot 34 is elongated, such that the ball 30 may be moved upstream and downstream in the valve chamber 28 when in a closed position, as is normal in many ball valve constructions. A circumferential flange 40 is formed around the valve stem 38 immediately above the lower rectangular end 36 to engage a flat surface 42 provided in the top of the valve chamber 28 and prevent the inadvertent removal of the valve stem 38 from the valve body 12 during operation. A sealing ring 44 is disposed in a circumferential groove 46 formed around the valve stem 38 to seal with the walls of the aperture 48 formed in the valve body 12 for receiving the valve stem. A suitable handle 50 is secured on the upper or outer end of the valve stem 38 by a pin or the like 52 for manually turning the valve stem 38 and valve ball 30. A projection 54 is formed on the lower end of the hub 56 of the handle 50 to engage stops (not shown) formed on the valve body 12 and limit the turning movement of the ball 30 to substantially ninety degrees between its open and closed positions as is common in the art.

The walls of the counterbore 16 adjacent the opposite ends of the valve chamber 28, and the end walls 20 and 24, form what may be considered sockets 58 for receiving the valve seats generally designated by the reference character 60. As shown in FIG. 1, two of the valve seats 60 are shown, one for each of the up-stream and downstream ends of the valve chamber 28, such that the valve 10 may be used in either direction in the fluid circuit. That is, what has been designated as the inlet 14 may be either the inlet or the outlet of the valve.

As shown and designated more in detail in FIG. 2, each valve seat 60 comprises an elastic material bearing ring 62 and an elastic material backing ring 64. The backing ring 64 has a lower modulus of elasticity than the bearing ring 62 so as not to materially interfere with the flexibility of the bearing ring 62, as will be set forth more in detail below. The bearing ring 62 may be, for example, nylon or Teflon, and the backing ring 64 may be, for example, a natural or synthetic rubber compound. As a whole, the valve seat 60 has an end wall 66 and an outer periphery 68 intersecting at an angle greater than the angle between the walls of the valve chamber 28 and the respective end wall 20 or 24 to provide what is designated herein as an expansion chamber 70 around a portion of the valve seat.

The bearing ring 62 is of substantially rectangular cross-section and extends at an angle across the respective seat receiving socket 58 to provide a tapered seating surface 72 facing the valve ball 30. The bearing ring 62 is of a size such that the opposite ends 74 and 76 thereof engage the walls of the valve chamber 28 and the respective end wall 24 when the ball 30 is centered in the valve chamber 28 to form annular supporting areas for the valve seat 60. In the centered position of the ball 30, the bearing ring 62 is only slightly flexed, but sufficient engagement is maintained between the ball 30 and the central portion of the seating surface 72 to provide a seal and prevent the leakage of fluid between the ball 30 and the valve seat 60 when the valve 30 is closed as shown in FIG. 2. The backing ring 64 is of generally triangular cross section and is molded to the back side 78 of the bearing ring 62 to provide a composite valve seat. It may also be noted in both FIGS. 1 and 2 that the back side 78 of the bearing ring 62 may be slightly relieved for reception of the backing ring 64 if desired.

OPERATION OF FIGS. 1–3 EMBODIMENT

As indicated above, the ball 30 only lightly engages the seating surface 72 of each of the valve seats 60 when the ball 30 is centered in the valve chamber 28. When the ball 30 is turned to a closed position as illustrated in FIG. 2, and no substantial pressure is developed in the inlet 14 of the valve 10, the ball 30 will remain in a substantially centered position. In this position of the ball 30, a seal is maintained both on the upstream and downstream sides of the ball 30. However, when a construction such as the valve seat 60 is utilized in both the upstream and downstream ends of the valve chamber 28, the downstream valve seat is the seat which is primarily relied upon to prevent the leakage of fluid into the outlet 26 of the valve.

When the ball 30 is moved to a closed position and a substantial pressure is developed in the inlet 14 of the valve 10, the ball 30 will be forced downstream by the pressure differential as illustrated in FIG. 3. As shown in this figure, the ball 30 flexes the central portion of the bearing ring 62 of the downstream valve seat 60 between the annular supporting areas 74 and 76. If the pressure differential across the ball 30 is sufficiently high, the ball 30 will move downstream until the backing ring 64 is completely forced into the expansion chamber 70 and fully engages the end wall 24 and the adjacent walls of the valve chamber 28. Thus, the backing ring 64 will become trapped in the respective seat receiving socket 58 and prevent further flexing or distortion of the respective bearing ring 62. As a result, the bearing ring 62 is not overstressed or overflexed, yet a substantial portion of the seating surface 72 of the bearing ring comes into engagement with the adjacent surface of the ball 30 to provide an effective seal between the valve seat 60 and the ball 30, even under high pressure service conditions. It will also be noted that since the bearing ring 62 is formed of a relatively hard material, such as one of the materials commonly known as a plastic material, the bearing ring will not be extruded between the ball 30 and either the wall 24 or the walls of the valve chamber 28. On the other hand, the thickness of the bearing ring 62 may be made sufficiently thin to provide the desired flexibility for the valve seat 60.

EMBODIMENT OF FIGS. 4–6

A slightly modified valve seat 60a is shown in its substantially relaxed condition in FIG. 4. The modified seat 60a includes the backing ring 64 and a bearing ring 62a of the same construction as the bearing ring 62 previously described, with only slight variations. Three circumferential grooves 80 are formed in the seating surface 72 of the bearing ring 62a facing the valve ball 30, and an elastic material sealing ring 82 is secured, as by bonding, in each of the grooves 80. Each sealing ring 82 is formed of an elastic material having a lower modulus of elasticity than the material of the bearing ring 62a and each sealing ring 82 preferably substantially fills its respective groove 80, such that the exposed surface of each of the sealing rings is coterminous with the seating surface 72. It may also be noted in FIG. 4 that the central groove 80 and sealing ring 82 are positioned in the central portion of the seating surface 72, such that the central sealing ring 82 will be engaged by the ball 30 when the ball 30 is moved to a closed position but remains substantially centered in the valve chamber 28.

Figure 6:
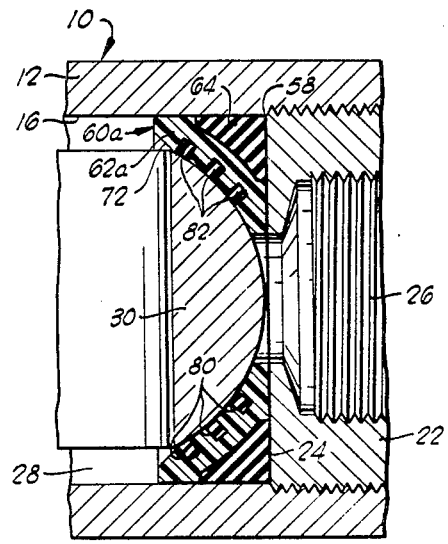
FIG. 6 is another view similar to FIG. 4 and showing the valve seat of FIG. 4 with the valve member moved downstream.

The valve seat 60a functions in the same manner as the downstream valve seat 60 previously described, insofar as the bearing ring 62a may be sufficiently flexed by downstream movement of the ball 30 to move the backing ring 64 into full engagement with the walls of the valve chamber 28 and the end wall 24, such that the backing ring 64 becomes trapped in the socket 58 to limit the flexing movement of the bearing ring 62a. It may also be observed in FIG. 6 that the valve ball 30 is moved to a position to engage each of the sealing rings 82 when the ball 30 is moved downstream to the maximum extent.

Figure 5:
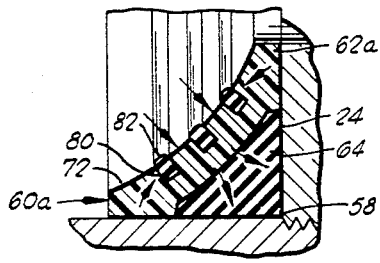
FIG. 5 is a partially schematic cross-sectional illustration of the valve seat of FIG. 4 showing the direction of forces generated in the valve seat when the valve member is moved downstream.

FIG. 5 schematically illustrates the forces developed in the valve seat 60a when the ball 30 is forced downstream in order to illustrate the functioning of the sealing rings 82. It will be observed that forces are generated in the bearing ring 62a in directions tending to reduce the volume of each of the circumferential grooves 80, and since the sealing rings 82 are formed of a material having a lower modulus of elasticity than the material of the bearing ring 62a, the sealing rings 82 will tend to be extruded from the respective grooves 80 toward the ball 30. In an actual operation, where the ball 30 is in engagement with the seating surface 72, only a very slight extrusion, if any, of the sealing rings will occur. However, the sealing rings are forced into tight sealing engagement with the ball 30 and provide a most effective seal to prevent the leakage of fluid around the ball 30, even under extremely high operating pressures.

EMBODIMENT OF FIG. 7

Figure 7:
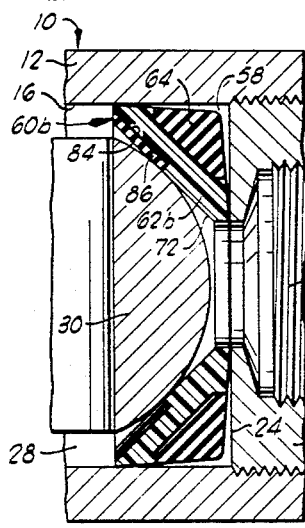
FIGS. 7, 8 and 9 are additional views similar to FIG. 2 showing further modified valve seats constructed in accordance with this invention.

Another modified valve seat 60b is shown in FIG. 7. This valve seat includes the backing ring 64 and a slightly modified bearing ring 62b. In the bearing ring 62b construction, substantially the outer half of the seating surface 72 is relieved in the form of a wide groove 84 formed from substantially the center of the seating surface to the outer edge of the seating surface. An elastic sealing material 86, having a lower modulus of elasticity than the material of the bearing ring 62b, is molded to the walls of the groove 84. The exposed surface of the sealing material 86 is preferably coterminous with the seating surface 72, such that the ball 30 will engage a portion of the sealing material 86 and a portion of the seating surface 72 when the ball is centered in the valve chamber 28.

When the ball 30 is used with the valve seat 60b and is moved downstream by a pressure differential, the bearing ring 62b will be flexed in the same manner as the bearing rings previously described until the backing ring 64 becomes trapped in the respective seat receiving socket 58. During such flexing movement of the bearing ring 62b, an additional portion of the sealing material 86 will be brought into engagement with the adjacent surface of the ball 30 to enhance the seal between the ball 30 and the seat 60b. It may also be noted here that since the groove 84 is formed in the outer portion of the seating surface 72, the sealing material 86 will be trapped between the walls of the groove 84 and the surface of the ball 30, such that the sealing material will not be extruded and damaged.

EMBODIMENT OF FIG. 8

Figure 8:
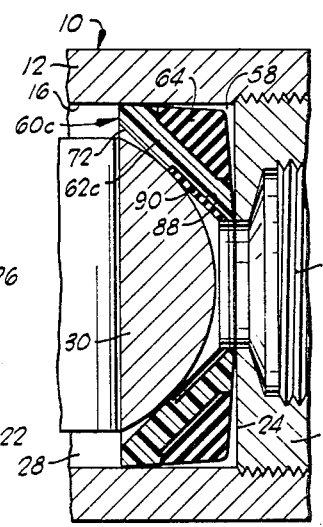

A further modified valve seat 60c is illustrated in FIG. 8. This construction is substantially the same as the valve seat 60b previously described. In this embodiment, however, a groove 88 is formed in the seating surface 72 from the central portion of the seating surface to the inner end of the seating surface. An elastic sealing material 90 is bonded to the walls of the grooves 88, and the exposed surface of the sealing material 90 is preferably coterminous with the seating surface 72. Also, of course, the sealing material 90 has a lower modulus of elasticity than the material of the bearing ring 62c.

The seat 60c operates in substantially the same manner as the seats previously described. A portion of the sealing material 90 will engage the adjacent surface of the ball 30 when the ball 30 is substantially centered in the valve chamber 28. When the ball 30 is moved downstream, additional portions of the sealing material 90 engage the ball and further enhance the seal between the valve seat 60c and the valve ball.

EMBODIMENT OF FIG. 9

Figure 9:
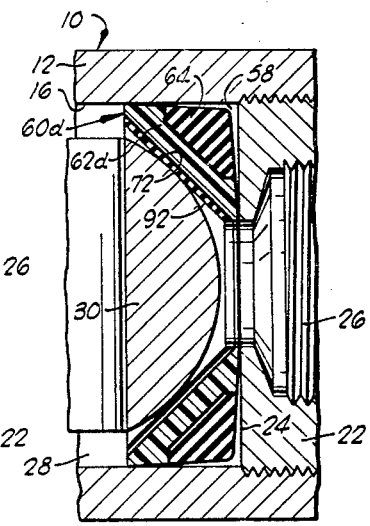

A still further modified valve seat 60d is shown in FIG. 9. This valve seat also utilizes the backing ring 64 and a modified bearing ring 62d. In this construction, an elastic sealing material 92, having a lower modulus of elasticity than the material of the bearing ring 62d, is bonded over the entire seating surface 72 of the bearing ring. The valve seat 60d is sized such that the central portion of the sealing material 92 will be in sealing engagement with the ball 30 when the ball 30 is substantially centered in the valve chamber 28. When the ball 30 is moved downstream as described above, additional portions of the sealing material 92 engage the valve ball and further enhance the seal between the seat 60d and the valve ball.

The valve seat 60d is contemplated for a lower pressure service than is contemplated for the remaining embodiments disclosed. The additional low modulus of elasticity sealing material 92 in engagement with the ball 30 when the ball 30 is substantially centered in the valve chamber will enhance the seal provided by the valve under low pressure service conditions.

From the foregoing, it will be apparent that the present invention provides a novel valve construction which may be economically manufactured, will have a long service life and which may be used effectively in both high and low pressure service. The valve seat of this invention requires no machining and will efficiently perform the dual functions of supporting the valve member and providing an effective seal with the valve member. The harder elastic material used in the valve seats of this invention is shaped to follow a valve member which is moved downstream by fluid pressure and yet will support the valve member in the desired operating position and will not be subjected to appreciable wear or damage, even under high pressure service conditions.

Changes may be made in the combination or arrangement of parts or elements as heretofore set forth in the specification and shown in the drawings, it being understood that changes may be made in the embodiments disclosed without departing from the spirit and scope of the invention as defined in the following claims.

What is claimed is:
1. A valve, comprising:
a body having an inlet and an outlet communicating with a valve chamber located in the central portion of the body;
a valve member positioned in the valve chamber for movement downstream toward the outlet when in a closed position; and
an annular valve seat in the valve chamber encircling the outlet to prevent leakage of fluid from the valve chamber around the valve member into the outlet, comprising:
    an elastic material bearing ring supported in the valve chamber in engagement with the valve member for flexing movement of a portion thereof generally downstream with the valve member when the valve member moves downstream; and
    an elastic material backing ring, having a lower modulus of elasticity than the bearing ring, secured to the side of the bearing ring opposite to the side of the bearing ring which engages the valve member in a position to engage the adjacent wall of the valve chamber and limit the flexing movement of the bearing ring.

2. A valve, comprising:
a body having an inlet and an outlet communicating with a valve chamber located in the central portion of the body;
a valve member positioned in the valve chamber for movement downstream toward the outlet when in a closed position; and
an annular valve seat in the valve chamber encircling the outlet to prevent leakage of fluid from the valve chamber around the valve member into the outlet, comprising:
    an elastic material bearing ring having an annular seating surface positioned to be engaged by the valve member when the valve member is centered in the valve chamber, said bearing ring having a pair of spaced, annular support areas engaging the walls of the valve chamber and supporting the surface of the bearing ring opposed to said seating surface in spaced relation from the walls of the valve chamber for flexing of the bearing ring between said supporting areas toward the walls of the valve chamber when the valve member moves downstream; and
    an elastic material backing ring secured to said opposed surface between said support areas positioned to engage the walls of the valve chamber and be trapped between the bearing ring and walls of the valve chamber to limit the flexing movement of the bearing ring when the valve member moves downstream, said backing ring having a lower modulus of elasticity than the bearing ring.

3. A valve, comprising:
a body having an inlet and an outlet communicating with a valve chamber in the central portion of the body, and having a valve-seat receiving socket in the valve chamber encircling the outlet, said socket having an end wall extending substantially normal to the axis of the outlet and a cylindrical outer wall extending into the valve chamber from said end wall;
a valve member positioned in the valve chamber for movement downstream toward the outlet when in a closed position; and
a valve seat in said socket, comprising:
    an elastic material bearing ring extending diagonally across said socket into engagement with the socket end and outer walls to provide a closed expansion chamber in said socket between the bearing ring and end and outer walls of the socket, said bearing ring having a seating surface positioned to be engaged by the valve member when the valve member is centered in the valve chamber and being flexible into said expansion chamber in response to downstream movement of the valve member; and an elastic material backing ring secured to the surface of the bearing ring facing said expansion chamber and partially filling said expansion chamber to engage the walls of said socket and limit the flexing of the bearing ring into the expansion chamber, said backing ring being formed of a material having a lower modulus of elasticity than the bearing ring.

4. A valve as defined in claim 3 wherein said valve member is a ball and the seating surface of said bearing ring extends at an angle to the vertical and only the central portion thereof contacts the ball when the ball is centered in the valve chamber.

5. A valve as defined in claim 4 wherein said bearing ring has a circumferential groove in the seating surface thereof facing the ball and positioned to be varied in width upon flexing of the bearing ring into and out of said expansion chamber, and characterized further to include:

a sealing ring secured in and substantially filling said groove to be extruded partially out of said groove upon flexing of the bearing ring into said expansion chamber to sealingly engage the ball, said sealing ring having a lower modulus of elasticity than the bearing ring.

6. A valve as defined in claim 5 wherein a plurality of said circumferential grooves and sealing rings are provided in the seating surface of the bearing ring.

7. A valve as defined in claim 5 wherein three of said circumferential grooves and sealing rings are provided in the seating surface of the bearing ring, one of said grooves and sealing rings being positioned in the central portion of said seating surface and the remaining grooves and sealing rings being positioned on opposite sides of said one groove and sealing ring.

8. A valve as defined in claim 4 characterized further to include a sealing material bonded across a portion of the seating surface of the bearing ring, said sealing material having a lower modulus of elasticity than the bearing ring.

9. A valve as defined in claim 4 characterized further to include a sealing material bonded over the entire seating surface of the bearing ring, said sealing material having a lower modulus of elasticity than the bearing ring.

10. A valve, comprising:
a body having an inlet and an outlet communicating with a valve chamber located in the central portion of the body;
a valve ball positioned in the valve chamber for movement downstream toward the outlet when in a closed position; and
an annular valve seat in the valve chamber encircling the outlet to prevent leakage of fluid from the valve chamber around the ball into the outlet, comprising:
an elastic material bearing ring extending at an angle across the downstream end of the valve chamber with the opposite ends thereof contacting the walls of the valve chamber to space the central portion of the bearing ring from the walls of the valve chamber and provide a closed expansion chamber between the central portion of the bearing ring and the adjacent walls of the valve chamber, said bearing ring having a seating surface opposite said expansion chamber and facing the ball positioned with the central portion thereof in contact with the ball when the ball is centered in the valve chamber, said bearing ring being flexible to be distorted into said expansion chamber when the ball is moved downstream; and an elastic material backing ring, having a lower modulus of elasticity than the bearing ring, positioned in and partially filling said expansion chamber to be trapped in said expansion chamber and limit the distortion of the bearing ring when the ball is moved downstream.

11. A valve as defined in claim 10 wherein said backing ring is secured to said bearing ring.

12. A valve as defined in claim 10 wherein said bearing ring has a circumferential groove in the seating surface thereof facing the ball and positioned to be varied in width upon flexing of the bearing ring into and out of said expansion chamber, and characterized further to include:

a sealing ring secured in and substantially filling said groove to be extruded partially out of said groove upon flexing of the bearing ring into said expansion chamber to sealingly engage the ball, said sealing ring having a lower modulus of elasticity than the bearing ring.

13. A valve as defined in claim 12 wherein a plurality of said circumferential grooves and sealing rings are provided in the seating surface of the bearing ring.

14. A valve as defined in claim 12 wherein three of said circumferential grooves and sealing rings are provided in the seating surface of the bearing ring, one of said grooves and sealing rings being located in the central portion of said seating surface and the remaining grooves and sealing rings being located on opposite sides of said one groove and sealing ring.

15. A valve as defined in claim 10 characterized further to include a sealing material bonded across a portion of the seating surface of the bearing ring, said sealing material having a lower modulus of elasticity than the bearing ring.

16. A valve as defined in claim 10 characterized further to include a sealing material bonded over the entire seating surface of the bearing ring, said sealing material having a lower modulus of elasticity than the bearing ring.

17. A seat for a valve containing a valve ball which moves downstream in response to pressure when the valve is closed, comprising:
an elastic material bearing ring having a seating surface to engage the valve ball and being of a cross-sectional thickness to flex when the valve ball is moved downstream; and
an elastic material backing ring, having a lower modulus of elasticity than the bearing ring, secured to the side of the bearing ring opposite to said seating surface in a position to be trapped in the valve when the bearing ring is flexed by downstream movement of the valve ball to limit said flexing of the bearing ring.

18. A seat for a valve containing a valve ball which moves downstream in response to pressure when the valve is closed, comprising:
an elastic material bearing ring of substantially rectangular cross-section having a seating surface extending at an angle to the vertical to be engaged by the valve ball and having annular supporting areas adjacent the opposite ends thereof, the bearing ring being of a thickness between said supporting areas to flex when engaged by the valve ball and the valve ball is forced downstream; and
an elastic material backing ring, having a lower modulus of elasticity than the bearing ring, secured to the side of the bearing ring opposite to said seating surface between said supporting areas to be trapped in the valve and limit the flexing movement of the bearing ring.

19. A seat as defined in claim 18 wherein said backing ring is of generally triangular cross section.

20. A seat as defined in claim 18 wherein said bearing ring has a circumferential groove in the seating surface thereof positioned to be varied in width upon flexing of the bearing ring, and characterized further to include:

a sealing ring secured in and substantially filling said groove to be extruded partially out of said groove upon flexing of the bearing ring in one direction, said sealing ring having a lower modulus of elasticity than the bearing ring.

21. A seat as defined in claim 20 wherein a plurality of said circumferential grooves and sealing rings are provided in the seating surface of the bearing ring.

22. A seat as defined in claim 20 wherein three of said circumferential grooves and sealing rings are provided in the seating surface of the bearing ring, one of said grooves and sealing rings being located in the central portion of said seating surface and the remaining grooves and sealing rings being positioned on opposite sides of said one groove and sealing ring.

23. A seat as defined in claim 18 characterized further to include a sealing material bonded across a portion of the seating surface of the bearing ring, said sealing material having a lower modulus of elasticity than the bearing ring.

24. A seat as defined in claim 18 characterized further to include a sealing material bonded over the entire seating surface of the bearing ring, said sealing material having a lower modulus of elasticity than the bearing ring.

References Cited

UNITED STATES PATENTS

| | | | |
|---|---|---|---|
| 3,331,582 | 7/1967 | Ford | 251—317 |
| 3,345,032 | 10/1967 | Rawstrom | 251—317 XR |
| 3,347,517 | 10/1967 | Scaramucci | 251—315 |
| 3,357,679 | 12/1967 | Gulick | 251—315 XR |

WILLIAM F. O'DEA, *Primary Examiner.*

H. W. WEAKLEY, *Assistant Examiner.*